| United States Patent [19] | [11] Patent Number: 5,006,626 |
| Hofer et al. | [45] Date of Patent: * Apr. 9, 1991 |

[54] EPOXY RESIN COMPOSITIONS

[75] Inventors: Arnold Hofer, Muttenz, Switzerland; Hans Gempeler, Aesch, Fed. Rep. of Germany

[73] Assignee: Ciba-Geigy Corporation, Ardsley, N.Y.

[*] Notice: The portion of the term of this patent subsequent to Dec. 5, 2006 has been disclaimed.

[21] Appl. No.: 411,951

[22] Filed: Sep. 25, 1989

[30] Foreign Application Priority Data

Sep. 29, 1988 [CH] Switzerland .......................... 3620/88
Jul. 27, 1989 [CH] Switzerland .......................... 2802/89

[51] Int. Cl.$^5$ .............................................. C08G 59/68
[52] U.S. Cl. ................................... 528/94; 252/182.23
[58] Field of Search ...................... 528/94; 252/182.23

[56] References Cited

U.S. PATENT DOCUMENTS

| 3,275,708 | 9/1966 | Bylsma | 525/396 |
| 4,474,935 | 10/1984 | Lopez | 528/94 X |
| 4,885,354 | 12/1989 | Mofer et al. | 528/94 |
| 4,925,901 | 5/1990 | Bertram et al. | 528/94 X |

*Primary Examiner*—Earl Nielsen
*Attorney, Agent, or Firm*—JoAnn Villamizar

[57] ABSTRACT

An epoxy resin composition comprising an epoxy resin which is solid at room temperature and contains on average more than epoxy group per molecule, and a quaternary pyrrolidinium salt as advancement catalyst.

When advanced with compounds containing two phenolic hydroxyl groups, these compositions give excellent products of low viscosity which are suitable, for example, for use in powder resin coating.

7 Claims, No Drawings

EPOXY RESIN COMPOSITIONS

The present invention relates to epoxy resin compositions which can be advanced in the presence of pyrrolidinium salts, as well as to the use of said salts as advancement catalysts for epoxy resins.

By advancement of epoxy resins is generally meant a chain lengthening and, associated therewith, an increase in the molecular weight of the epoxy resins. A principal factor in this connection is the selectivity of the catalyst employed which shall ensure the formation of polyhydroxy ethers.

Concurrently with the selectivity, advancement catalysts shall be sufficiently reactive to facilitate the formation of linear, solid advanced epoxy resins of higher molecular weight at an economically useful rate. Owing to the opening of the epoxide ring, high reaction rates are accompanied by pronounced evolution of heat, and the heat so generated can be used for heating the reaction mixture.

Many compounds have been proposed or described as catalysts for the advancement of liquid epoxy resins. Some of these compounds, however, are not selective and cause branching or crosslinking. Others are in turn ineffective for promoting the strongly exothermic advancement reactions to form a satisfactorily advanced linear solid epoxy resin at a useful rate.

Known advancement catalysts are, for example, tetraalkylammonium hydroxides or halides (q.v. U.S. Pat. No. 4 465 722). In addition, N-methylmorpholine has been proposed as advancement catalyst in U.S. Pat. No. 3 275 708. An undesirable side-effect of the prior art catalysts is the cleavage of chemical compounds in the reaction mixture, which not only adversely affects the homogeneity of the desired product, but also results also in poorer colour properties of the advanced product having to be tolerated. Replacement of N-methylmorpholine by N-methylpyrrolidine leads to the formation of double the content of fission products which is a distinct disadvantage. Surprisingly, it has been found that pyrrolidinium salts lead to advanced resins having a markedly lower content of fission products. The advanced epoxy resins so obtained are distinguished by low viscosity, high temperature resistance and high linearity.

The present invention relates to epoxy resin compositions comprising an epoxy resin which is solid at room temperature and contains on average more than one epoxy group per molecule, and at least one quaternary pyrrolidinium salt as advancement catalyst.

Suitable epoxy compounds are in particular those having a relatively low molecular weight, for example lower than 3 500, preferably lower than 2 000 and, most preferably, in the range from 175 to 350. The diglycidyl compounds which are preferably used may be ethers or esters, and the glycidyl groups may also be attached to nitrogen atoms. The phenols from which the ethers are derived are, for example: mononuclear diphenols (for example resorcinol), naphthalenes containing two hydroxyl groups, for example 1,4-dihydroxynaphthalene, biphenyls and other binuclear aromatic compounds which contain a methylene, isopropylidene, O—, SO₂—, or S— bridge and two hydroxyl groups attached to the aromatic nuclei, for example preferably bisphenol A, bisphenol F or bisphenol S, and in which the benzene nuclei may also contain halogen atoms, for example tetrabromobisphenol A. The glycidyl esters are based, for example, on phthalic acid, terephthalic acid, tetrahydrophthalic acid, hexahydrophthalic acid, adipic acid, trimethyladipic acid or sebacic acid. Also suitable are mononuclear hydantoins which carry glycidyl groups at the nitrogen atoms, for example N,N′-diglycidylhydantoins. Other glycidyl compounds which contain nitrogen-containing rings are derived from 5,6-dihydrouracils or barbituric acids.

These products are known and most are commercially available.

The advancement catalysts used in the practice of this invention are, for example, pyrrolidinium salts of formula I

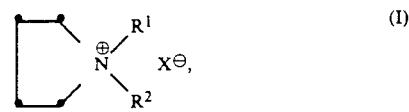

wherein R¹ is C₁–C₈alkyl and R² is C₁–C₈alkyl, C₂–C₈-hydroxyalkyl, C₄–C₈alkoxyhydroxyalkyl, C₂–C₈alkenyl, C₃–C₈alkoxycarbonylalkyl, C₃–C₈alkylcarbonylalkyl, C₇–C₉phenylalkyl, C₇–C₉phenylhydroxyalkyl or phenylcarbonylmethyl, and X is halogen or acetate.

Suitable pyrrolidinium salts are preferably those of formula (Ib),

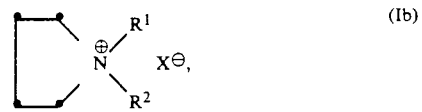

wherein R¹ is C₁–C₈alkyl and R² is C₁–C₈alkyl, C₂–C₈-hydroxyalkyl or benzyl, and X is halogen or acetate.

C₁–C₈Alkyl radicals, preferably C₁–C₄alkyl radicals, are suitably methyl, ethyl, n-propyl, n-butyl, n-hexyl or n-octyl. These radicals may carry—preferably in 2-position (if available)—a hydroxy group. Preferably R¹ is methyl or ethyl and R² is ethyl.

C₄–C₈Alkoxyhydroxyalkyl radicals are radicals which contain an ether function as well as a hydroxyl group. Exemplary of such radicals is (2-hydroxy-3-butoxy)propyl.

R² as alkenyl may be allyl or methallyl. R² may further be acetonyl, ethoxycarbonylmethyl, (2-hydroxy-2-phenyl)ethyl or phenylcarbonylmethyl (=phenacyl).

X as halogen is preferably iodo, bromo or chloro. Iodo is most preferred.

The compounds of formula I are known and can be prepared in known manner, for example by reacting a pyrrolidine of formula II

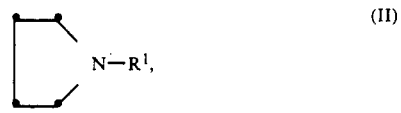

with a compound of formula III $R^2-X$. 

In this connection, attention is drawn to the Examples herein.

The suitable pyrrolidinium salt is used in catalytic amounts, for example in an amount of ca. 2 bis 5000, preferably 20 to 2000 and, most preferably, 50 to 1000 ppm, based on the weight of the basic resin.

The advancement reaction is carried out in known manner, for example by reacting the epoxy resin with compounds which preferably contain two phenolic hydroxyl groups.

In this reaction it is possible to use all aromatic compounds containing preferably two phenolic hydroxyl groups and known in the technology of advancement. Typical examples of such compounds are: mononuclear diphenols (for example resorcinol), naphthalenes containing two hydroxyl groups, for example 1,4-dihydroxynaphthalene, biphenyls and other binuclear aromatic compounds which contain a methylene, isopropylidene, O—, $SO_2$—, or S— bridge and two hydroxyl groups attached to the aromatic nuclei, for example preferably bisphenol A, bisphenol F or bisphenol S, and in which the benzene nuclei may also contain halogen atoms, for example tetrabromobisphenol A.

The amount of the phenol will depend on the type of product desired. The greater the amount, the higher the molecular weight of the final product will normally be. The melting point will also increase and the physical and chemical properties of the resin obtained will undergo change.

The advancement methods and the mode of carrying them out are known and described, for example, in U.S. Pat. Nos. 3 275 708 and 4 465 722.

The reaction is carried out, for example, in the temperature range from 100°–220° C., preferably from 120°–190° C., and under a pressure of 10 to 1000 mbar, preferably 200–800 mbar.

The advanced epoxy resins so obtained are distinguished by high stability of the epoxy value and of the viscosity after exposure to heat. Further, these resins have a low viscosity which is useful for further processing. It has been found that the advancement catalysts used in the practice of this invention have a constant activity in the reaction, and their high selectivity results in the formation of exceedingly linear products. In addition, the use of a chain terminator can be dispensed with. If desired, the use of a monofunctional chain terminator, for example a phenol, is also suitable for carrying out the advancement optimally. The catalysts are effective in relatively small amounts, the reaction proceeds rapidly, and only an insignificant propensity to undesirable phenol cleavage is observed. This last mentioned feature is seen in the good colour constancy of the products.

The cured final products (prepared by crosslinking with customary hardeners for epoxy resins, for example acid anhydrides, polyamines, polyhydric phenols and the like) have good flexibility.

The products can be used for surface protection, for the fabrication of castings, especially in the electrical field, of prepregs and laminates. Their use for the preparation of solid resins as binders for powder coating compositions, for water-soluble primers (for example for automobile bodies), and for can and tube lacquers merits special mention.

EXAMPLE 1

N,N-Dimethylpyrrolidinium chloride

The following substances are reacted in a small glass autoclave:
60.0 g (0.7 mol) of N-methylpyrrolidine,
300 ml of methyl ethyl ketone (MEK),
65 g (1.06 mol) of methyl chloride.

After charging the first two substances, the autoclave is closed, preheated to 30° C., and simultaneously the amount of methyl chloride weighed into a separate pressure vessel is added to the autoclave. During the reaction time of 3 hours, the temperature rises to ca. 90° C. and the pressure to $3.5 \cdot 10^5$ Pa. After removing the pressure, the mixture is filtered with suction and the filter residue is washed with MEK and dried in a vacuum drier. Yield: 85 g (90%); m.p. >340° C. with decomposition.

EXAMPLE 2

N-Ethyl-N-methylpyrrolidinium iodide

The following substances are reacted in a 500 ml flask with ground-glass stopper:
21.3 ml (0.2 mol) of N-methylpyrrolidine,
300 ml of methyl ethyl ketone (MEK),
16.3 ml (0.2 mol) of ethyl iodide.

After a reaction time of 2 hours at 45° C., the reaction mixture is filtered with suction and the filter residue is washed with a small volume of MEK and dried in a vacuum drier. Yield: 45 g (92%), m.p. 302°–305° C.

EXAMPLE 3

N-Butyl-N-methylpyrrolidinium bromide

The following substances are reacted at 60° C. in a 500 ml flask with ground glass stopper:
21.3 ml (0.2 mol) of N-methylpyrrolidine,
50.0 ml of methyl isobutyl ketone (MIBK),
20.8 ml (0.2 mol) of butyl bromide.

After a reaction time of 2 hours, the mixture (dense crystal slurry) is diluted with a further 40 ml of MIBK and filtered with suction. The filter residue is washed with MIBK and dried. Yield: 36 g (81%); m.p. 199°–201° C.

EXAMPLE 4

N-Benzyl-N-methylpyrrolidinium chloride

The following substances are reacted at 60° C. in a 500 ml flask with ground-glass stopper:
21.3 ml (0.2 mol) of N-methylpyrrolidine,
50.0 ml of methyl ethyl ketone (MEK),
25.3 ml (0.2 mol) of benzyl chloride.

After a reaction time of 4 hours, the reaction mixture is diluted with a small volume of MEK and filtered with suction. The filter residue is washed with MEK and dried. Yield: 21 g (50%); m.p. 246°–249° C.

EXAMPLE 5

N-Acetonyl-N-methylpyrrolidinium chloride

The following substances are reacted at 50° C. in a 500 ml flask with ground glass stopper:
21.3 ml (0.2 mol) of N-methylpyrrolidine,
40.0 ml of methyl isobutyl ketone (MIBK),
16.7 ml (0.2 mol) of chloroacetone.

After a reaction time of 5 hours, the mixture is concentrated on a rotary evaporator and the honey-like reaction product is diluted to a 50% solution in butanol. The yield is 33.9 g≏94% and the refractive index of the undiluted product is $n^D{}_{20} = 1.481$.

EXAMPLE 6

N-Allyl-N-methylpyrrolidinium bromide

The first two of the following substances are mixed in a 1000 ml flask with ground-glass stopper and the third substance is added in 5 portions, with simultaneous cooling:
53.3 ml (0.5 mol) of N-methylpyrrolidine,
160.0 ml of methyl isobutyl ketone (MIBK),
42.3 ml (0.5 mol) of allyl bromide.

The reaction mixture is first stirred at ca. 20° C. and the temperature is slowly raised to 40° C. After 4 hours the mixture is concentrated on a rotary evaporator and the honey-like reaction product is diluted to a 50% solution in butanol. The yield is 100.5 g≙97%, and the refractive index $n^D{}_{20} = 1.520$.

EXAMPLE 7

N-Butyl-N-methylpyrrolidinium iodide

The following substances are mixed in a 1000 ml flask with ground-glass stopper and reacted at 60° C. on a water bath:
53.3 ml (0.5 mol) of N-methylpyrrolidine,
100.0 ml of methyl isobutyl ketone (MIBK),
57.2 ml (0.5 mol) of butyl iodide.

After ca. 4 hours, the crystal slurry is diluted with a small volume of MIBK and filtered with suction. The filter residue is washed with MIBK and dried under vacuum. Yield: 124.9 g≙93%, m.p. 180°–182° C.

EXAMPLE 8

N-Ethoxycarbonylmethyl-N-methylpyrrolidinium bromide

The first two of the following substances are mixed in a 1000 ml flask with a ground-glass stopper, and the third substance is slowly added in 5 portions, with simultaneous cooling:
21.3 ml (0.2 mol) of N-methylpyrrolidine,
120.0 ml of methyl isobutyl ketone (MIBK),
23.0 ml (0.2 mol) of ethyl bromoacetate.

The reaction is initially carried out at ca. 30° C. and then the temperature is slowly raised to 50° C. After 4 hours the crystalline slurry is cooled, diluted with 40 ml of MIBK and filtered with suction. The filter residue is washed with a small volume of MIBK and dried under vacuum. Yield: 46.7 g≙92%, m.p. 135°–137° C.

EXAMPLE 9

N-Methallyl-N-methylpyrrolidinium chloride

The following substances are mixed in a 500 ml flask with ground-glass stopper and reacted at 50° C.:
21.3 ml (0.2 mol) of N-methylpyrrolidine,
50.0 ml of methyl isobutyl ketone (MIBK),
19.6 ml (0.2 mol) of o-methallyl chloride.

After 3 hours, the crystalline slurry is diluted with a small volume of MIBK and filtered with suction. The filter residue is washed with MIBK and dried under vacuum. Yield: 19.7 g≙56%; m.p. 79°–80° C.

EXAMPLE 10

N,N-Dibutylpyrrolidinium iodide

The first three of the following substances are charged to a 250 ml sulfonating flask fitted with stirrer, condenser and drip funnel, and the fourth substance is added dropwise over ca. 30 minutes:
16.5 ml (0.2 mol) of pyrrolidine,
80.0 ml of methyl isobutyl ketone (MIBK),
21.2 g (0.2 mol) of sodium carbonate sicc.
45.6 ml (0.4 mol) of butyl iodide.

The reaction is initially violent and the sulfonating flask must therefore be cooled externally by immersion in the still cold oil bath. The temperature is raised to 60° C. and kept for 6 hours. To the solution of the crystalline product are added 50 ml of methanol and the precipitate is filtered with suction at room temperature. After washing with 30 ml of methanol, the filtrate is concentrated on a rotary evaporator until the product crystallises. The crystalline product is taken up in MIBK, filtered with suction, washed and dried. Yield: 18.2 g≙28%, melting point 182°–184° C.

EXAMPLE 11

N-Phenylcarbonylmethyl-N-methylpyrrolidinium bromide

The first two of the following substances are mixed in a flask with ground-glass stopper, and the third substance is slowly added in 5 portions, with simultaneous cooling:
21.3 ml (0.2 mol) of N-methylpyrrolidine,
120.0 ml of methyl isobutyl ketone (MIBK),
39.8 g (0.2 mol) of phenacyl bromide.

The reaction mixture is first stirred at room temperature and then the temperature is slowly raised to 40° C. After an interval of 2 hours, the crystal slurry is filtered with suction and the filter residue is washed with MIBK and dried. Yield: 54.9 g≙96%, m.p. 171°–173° C.

EXAMPLE 12

N-2-Hydroxybutyl-N-2'-hydroxyethylpyrrolidinium acetate

The following substances are mixed (cooling necessary) in a 500 ml flask with ground-glass stopper and reacted at 50° C.:
23.5 ml (0.2 mol) of N-hydroxyethylpyrrolidine,
60.0 ml of methyl isobutyl ketone (MIBK),
11.4 ml (0.2 mol) of glacial acetic acid,
17.4 ml (0.2 mol) of butylene-1-oxide.

After a reaction time of 9 hours, the mixture is concentrated by distillation on a rotary evaporator until all volatile constituents are distilled off. After reweighing the tared flask, the yield is 44.2 g≙89% and the refractive index $n^D{}_{20} = 1.466$. The viscous product is diluted to a 50% solution in butanol.

EXAMPLE 13

N-2-Hydroxybutyl-N-methylpyrrolidinium acetate

The following substances are reacted at 50° C. in accordance with the procedures described in the foregoing Examples:
21.3 ml (0.2 mol) of N-methylpyrrolidine,
40.0 ml of methyl ethyl ketone (MEK),
11.4 ml (0.2 mol) of glacial acetic acid,
17.4 ml (0.2 mol) of butylene-1-oxide.

After 12 hours all volatile constituents are removed from the reaction mixture by distillation and the tared flask is reweighed. Yield: 38.2 g≙88%, $n^D{}_{20} = 1.460$.

EXAMPLE 14

N-2-Hydroxy-2-phenylethyl-N-methylpyrrolidinium acetate

The following substances are reacted at 60° C. in a flask with ground-glass stopper, which has been tared beforehand:
21.3 ml (0.2 mol) of N-methylpyrrolidine,
30.0 ml of methyl isobutyl ketone (MIBK),
11.4 ml (0.2 mol) of glacial acetic acid,
23.6 ml (0.2 mol) of styrene oxide.

After a reaction time of 6 hours at 60° C., the volatile constituents are removed by distillation and the flask is reweighed. The viscous product is obtained in a yield of 47.1 g ≙ 89% and has a refractive index of $n^D_{20}=1.512$. A 50% solution of the product in butanol is prepared.

EXAMPLE 15

N,N-Diethylpyrrolidinium iodide

Following the procedure of Example 10, pyrrolidine is reacted with twice the amount of alkylating agent. The first three of the following substances are charged to a 250 ml sulfonating flask fitted with stirrer, condenser and drip funnel, and the fourth substance is added dropwise:
16.5 ml (0.2 mol) of pyrrolidine,
80.0 ml of methyl isobutyl ketone (MIBK),
21.2 g (0.2 mol) of sodium carbonate sicc.,
32.4 ml (0.4 mol) of ethyl iodide.

On account of the initially violent reaction, the flask is cooled by the still cold oil bath and the temperature is raised by additional heating to 60° C. and kept for 6 hours. To the solution of the crystalline product are added 50 ml of methanol and the precipitate is filtered with suction at room temperature. After washing with methanol, the filtrate is concentrated on a rotary evaporator until the product crystallises. The crystalline product is taken up in MIBK, filtered with suction, washed and dried. Yield: 25.1 g ≙ 47%, m.p. 241°–244° C.

EXAMPLE 16

N-2-Hydroxy-3-butoxypropyl-N-methylpyrrolidinium acetate

Following the procedure of Example 14, the following substances are reacted in a tared flask with a ground-glass stopper at 60° C.:
21.3 ml (0.2 mol) of N-methylpyrrolidine,
30.0 ml of methyl isobutyl ketone (MIBK),
11.4 ml (0.2 mol) of glacial acetic acid,
29.1 ml (0.2 mol) of butyl glycide.

After a reaction time of 6 hours all volatile constituents are removed by distillation and the flask is reweighed. Yield: 45.7 g ≙ 83%; $n^D_{20}=1.464$. A 50% solution of the viscous product in butanol is prepared.

ADVANCEMENT REACTIONS

EXAMPLE 17

With stirring, 845 g of bisphenol A diglycidyl ether having an epoxy value of 5.4 eq/kg are heated in a polymer flask and mixed at 100° C. with a first portion (217 g) of bisphenol A. Then a butanolic solution of N,N-dimethylpyrrolidinium chloride (Example 1) is added as catalyst in a concentration of 500 ppm (3.7 mmol/kg), based on the basic resin. Simultaneously the temperature is raised with constant stirring, and at 170° C. the second portion (217 g) of bisphenol A is added, after which the temperature is kept at 180° C. After ca. 3-4 hours the epoxy value of the reaction mixture is 0.60 eq/kg (controlled by titration), and the resin melt can be discharged, cooled and comminuted. The viscosities of this resin (40% in butylcarbitol, 25° C.) are 2250 mPa.s and 3350 mPa.s after a heat treatment for 4 hours at 180° C.

EXAMPLE 18

The procedure of Example 17 is repeated, using N-ethyl-N-methylpyrrolidinium iodide (Example 2) as catalyst in a concentration of 1000 ppm (4.1 mmol/kg), based on the basic resin. This resin has a viscosity of 1950 mPa.s and of 2760 mPa.s after a heat treatment.

EXAMPLE 19

The procedure of Example 17 is repeated, using N-butyl-N-methylpyrrolidinium bromide (Example 3) as catalyst in a concentration of 1000 ppm (4.5 mmol/kg), based on the basic resin. This resin has a viscosity of 2070 mPa.s and of 2800 mPa.s after a heat treatment.

EXAMPLE 20

The procedure of Example 17 is repeated, using N-benzyl-N-methylpyrrolidinium chloride (Example 4) as catalyst in a concentration of 2500 ppm (12.0 mmol/kg), based on the basic resin. This resin has a viscosity of 2280 mPa.s and of 3350 mPa.s after a heat treatment.

EXAMPLE 21

The procedure of Example 17 is repeated, using N-acetonyl-N-methylpyrrolidinium chloride (Example 5) as catalyst in a concentration of 3000 ppm (16.9 mmol/kg), based on the basic resin. This resin has a viscosity of 2000 mPa.s and of 2800 mPa.s after a heat treatment for 4 hours at 180° C.

EXAMPLE 22

The procedure of Example 17 is repeated, using N-allyl-N-methylpyrrolidinium chloride (Example 6) as catalyst in a concentration of 2000 ppm (9.7 mmol/kg), based on the basic resin. This resin has a viscosity of 1940 mPa.s and of 2560 mPa.s after a heat treatment for 4 hours at 180° C.

EXAMPLE 23

The procedure of Example 17 is repeated, using N-butyl-N-methylpyrrolidinium iodide (Example 7) as catalyst in a concentration of 1500 ppm (5.6 mmol/kg), based on the basic resin. This resin has a viscosity of 1800 mPa.s and of 2400 mPa.s after a heat treatment for 4 hours at 180° C.

EXAMPLE 24

The procedure of Example 17 is repeated, using N-ethoxycarbonylmethyl-N-methylpyrrolidinium bromide (Example 8) as catalyst in a concentration of 3000 ppm (11.9 mmol/kg), based on the basic resin. This resin has a viscosity of 1350 mPa.s and of 1700 mPa.s after a heat treatment for 4 hours at 180° C.

EXAMPLE 25

The procedure of Example 17 is repeated, using N-methallyl-N-methylpyrrolidinium chloride (Example 9) as catalyst in a concentration of 2000 ppm (11.4 mmol/kg), based on the basic resin. This resin has a viscosity of 2240 mPa.s and of 3520 mPa.s after a heat treatment for 4 hours at 180° C.

EXAMPLE 26

The procedure of Example 17 is repeated, using N,N-dibutylpyrrolidinium iodide (Example 10) as catalyst in a concentration of 400 ppm (1.2 mmol/kg), based on the basic resin. This resin has a viscosity of 2300 mPa.s and of 2650 mPa.s after a heat treatment for 4 hours at 180° C.

EXAMPLE 27

The procedure of Example 17 is repeated, using N-phenylcarbonylmethyl-N-methylpyrrolidinium bromide (Example 11) as catalyst in a concentration of 3000 ppm (10.6 mmol/kg), based on the basic resin. This resin has a viscosity of 1200 mPa.s and of 1600 mPa.s after a heat treatment for 4 hours at 180° C.

EXAMPLE 28

The procedure of Example 17 is repeated, using N-2-hydroxybutyl-N-2-hydroxyethylpyrrolidinium acetate (Example 12) as catalyst in a concentration of 4000 ppm (16.2 mmol/kg), based on the basic resin. This resin has a viscosity of 1040 mPa.s and of 1750 mPa.s after a heat treatment for 4 hours at 180° C.

EXAMPLE 29

The procedure of Example 17 is repeated, using N-2-hydroxybutyl-N-methylpyrrolidinium acetate (Example 13) as catalyst in concentration of 2000 ppm (9.3 mmol/kg), based on the basic resin. This resin has a viscosity of 1920 mPa.s and of 2640 mPa.s after a heat treatment for 4 hours at 180° C.

EXAMPLE 30

The procedure of Example 17 is repeated, using N-2-hydroxy-2-phenylethyl-N-methylpyrrolidinium acetate (Example 14) as catalyst in a concentration of 4000 ppm (15.1 mmol/kg), based on the basic resin. This resin has a viscosity of 1160 mPa.s and of 1800 mPa.s after a heat treatment for 4 hours at 180° C.

EXAMPLE 31

The procedure of Example 17 is repeated, using N,N-diethylpyrrolidinium iodide (Example 15) as catalyst in a concentration of 300 ppm (1.1 mmol/kg), based on the basic resin. This resin has a viscosity of 2620 mPa.s and of 3450 mPa.s after a heat treatment for 4 hours at 180° C.

EXAMPLE 32

The procedure of Example 17 is repeated, using 2-hydroxy-3-butoxypropyl-N-methylpyrrolidinium acetate (Example 16) as catalyst in a concentration of 3000 ppm (10.9 mmol/kg), based on the basic resin. This resin has a viscosity of 2100 mPa.s and of 2920 mPa.s after a heat treatment for 4 hours at 180° C.

What is claimed is:

1. An epoxy resin composition comprising an epoxy resin which is solid at room temperature and contains on average more than one epoxy group per molecule, and at least one quaternary pyrrolidinium salt as advancement catalyst.

2. An epoxy resin composition according to claim 1 comprising diglycidyl compounds having a molecular weight below 3500.

3. An epoxy resin composition according to claim 1 comprising a pyrrolidinium salt of formula I

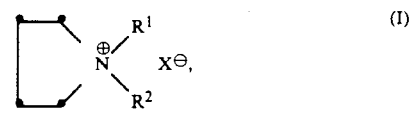

wherein $R^1$ is $C_1$-$C_8$alkyl and $R^2$ is $C_1$-$C_8$alkyl, $C_2$-$C_8$hydroxyalkyl, $C_4$-$C_8$alkoxyhydroxyalkyl, $C_2$-$C_8$alkenyl, $C_3$-$C_8$alkoxycarbonylalkyl, $C_3$-$C_8$alkylcarbonylalkyl, $C_7$-$C_9$phenylalkyl, $C_7$-$C_9$phenylhydroxyalkyl or phenylcarbonylmethyl, and X is halogen or acetate.

4. An epoxy resin composition according to claim 1 comprising a pyrrolidinium salt of formula Ib,

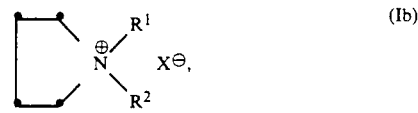

wherein $R^1$ is $C_1$-$C_8$alkyl and $R^2$ is $C_1$-$C_8$hydroxyalkyl or benzyl, and X is halogen or acetate.

5. An epoxy resin composition according to claim 3 comprising a pyrrolidinium salt of formula I, wherein $R^1$ is methyl or ethyl and $R^2$ is ethyl.

6. An epoxy resin composition according to claim 3 comprising a pyrrolidinium salt of formula I, wherein X is iodo.

7. An epoxy resin composition according to claim 1 additionally comprising a compound which contains two phenolic hydroxyl groups.

* * * * *